United States Patent [19]

Suga et al.

[11] Patent Number: 4,868,680
[45] Date of Patent: Sep. 19, 1989

[54] IMAGE PICKUP APPARATUS

[75] Inventors: Akira Suga; Tadashi Okino, both of Tokyo, Japan

[73] Assignee: Canon Kabushiki Kaisha, Tokyo, Japan

[21] Appl. No.: 208,810

[22] Filed: Jun. 22, 1988

Related U.S. Application Data

[63] Continuation of Ser. No. 874,629, Jun. 16, 1986, abandoned, which is a continuation of Ser. No. 580,954, Feb. 16, 1984, Pat. No. 4,622,596.

[30] Foreign Application Priority Data

| Feb. 21, 1983 | [JP] | Japan | 58-27291 |
| Feb. 21, 1983 | [JP] | Japan | 58-27292 |
| Feb. 21, 1983 | [JP] | Japan | 58-27293 |
| Feb. 21, 1983 | [JP] | Japan | 58-27294 |

[51] Int. Cl.$^4$ .............................................. H04N 5/76
[52] U.S. Cl. .................................................. 358/335
[58] Field of Search ............... 358/335, 906, 213.11, 358/213.19, 213.23, 213.24, 213.25, 213.26; 360/33.1, 35.1; 357/24 LR, 3 D

[56] References Cited

U.S. PATENT DOCUMENTS

| 4,245,164 | 1/1981 | Funahashi | 357/30 |
| 4,263,623 | 4/1981 | Woo et al. | 358/906 |
| 4,328,432 | 5/1982 | Yamazaki | 357/24 |
| 4,366,501 | 12/1982 | Tsunakawa et al. | 358/906 |
| 4,420,773 | 12/1983 | Toyoda et al. | 358/335 |
| 4,456,931 | 6/1984 | Toyoda et al. | 358/335 |
| 4,546,390 | 10/1985 | Konishi et al. | 358/906 |
| 4,622,596 | 11/1986 | Suga et al. | 358/335 |
| 4,641,215 | 2/1987 | Katoh et al. | 358/906 |
| 4,658,304 | 4/1987 | Tsunekawa et al. | 358/310 |
| 4,675,747 | 6/1987 | Hanma et al. | 358/906 |
| 4,763,204 | 8/1988 | Kinoshita et al. | 358/335 |

Primary Examiner—Donald McElheny, Jr.
Attorney, Agent, or Firm—Fitzpatrick, Cella, Harper & Scinto

[57] ABSTRACT

An image pickup apparatus comprises: an image sensor for converting an optical image into distribution information of minority carrier; a control circuit for periodically forming a first state in that majority carrier is accumulated in the image sensor and a second state in that at least a part of the minority carrier is recombined with this majority carrier; a readout circuit for reading out the information in the image sensor; a recording apparatus for selectively recording the information for a predetermined interval from the information to be read out by the readout circuit with regard to the trigger operation for a still photograph; and a stopping circuit for stopping the control operation of the control circuit in association with the start of the recording by the recording apparatus or the closing of a shutter or in response to a low luminous condition or the like.

10 Claims, 10 Drawing Sheets

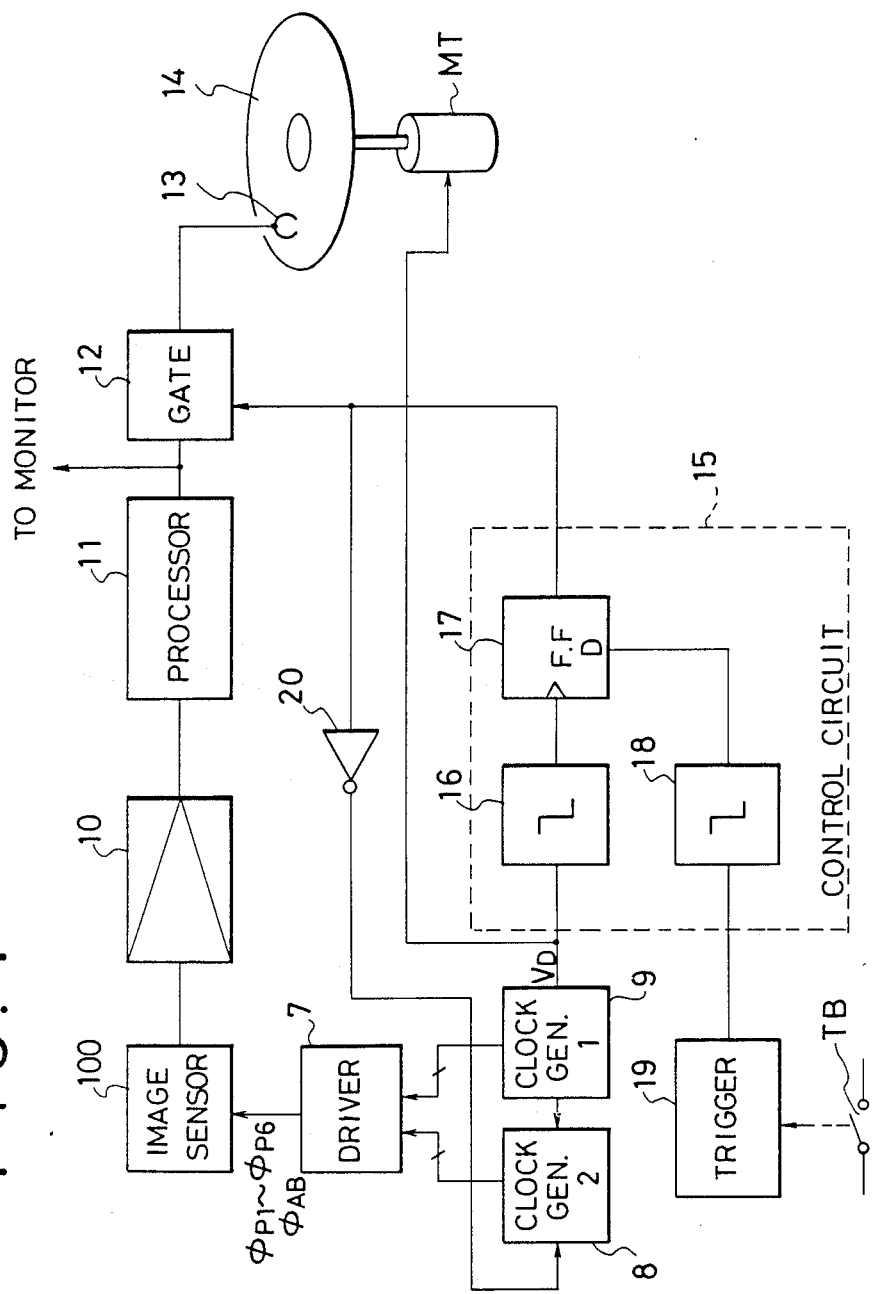

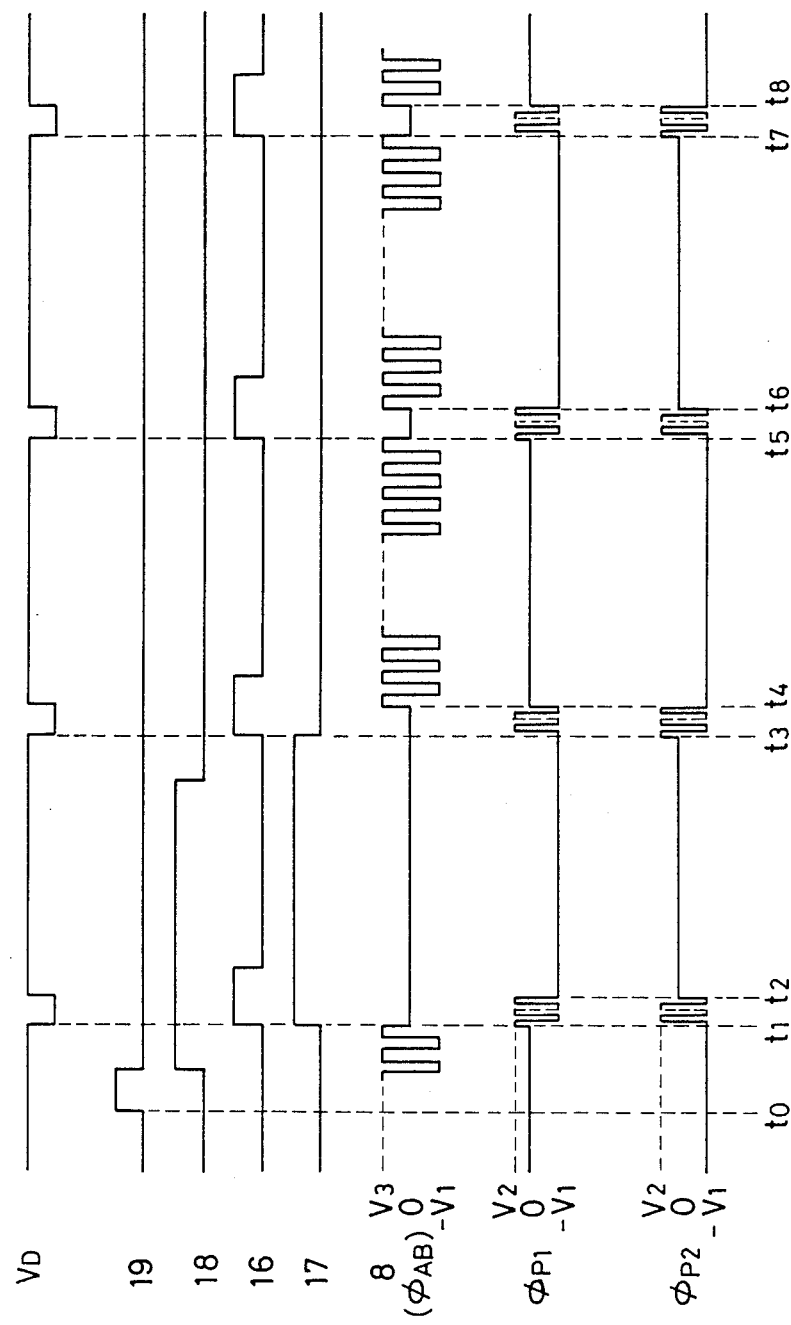

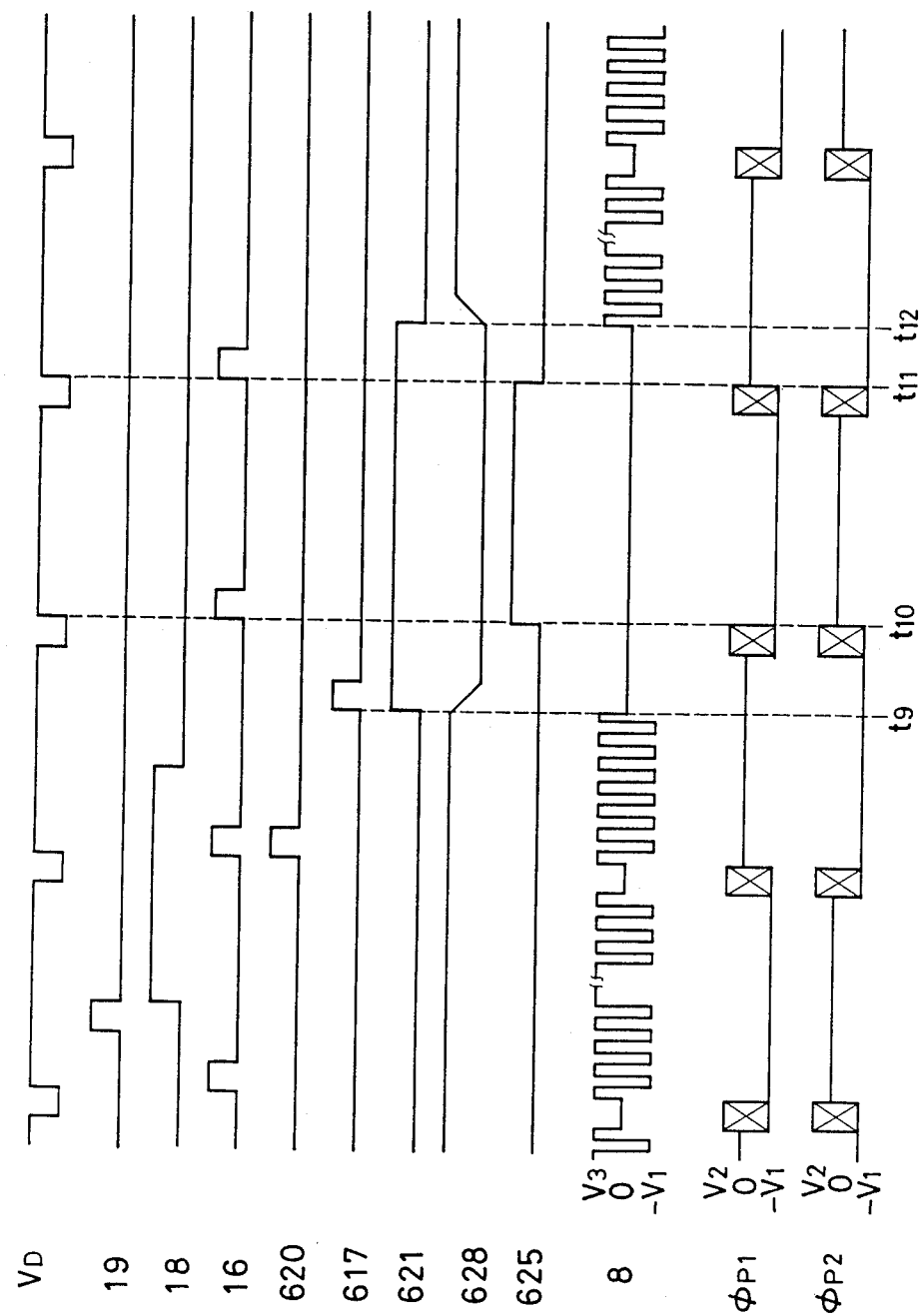

IMAGE PICKUP APPARATUS

This application is a continuation of application Ser. No. 874,629, filed June 16, 1986, abandoned, which is a continuation of Ser No. 580,954, filed Feb. 16, 1984, U.S. Pat. No. 4,622,596.

FIELD OF THE INVENTION

The present invention relates to an image pickup apparatus which can effectively suppress the blooming.

BACKGROUND OF THE INVENTION

Generally, in solid state image sensors such as a CCD or the like, there has been considered a method whereby an overflow drain is provided in the photosensing surface to prevent the blooming or the overflow carriers are extinguished using the surface recombination.

In particular, the latter method is known by, for example, United Kingdom Patent Publication Gazette GB No. 2,069,759A (applicant, N. V. Philips; inventors, Marnix Guillaume Collet et al), and the like. Such a method has advantages such that sensitivity is high since an aperture in the photosensing surface is not sacrificed and that horizontal resolution is raised since the integration degree can be improved, and the like.

FIGS. 1–3 show diagrams to describe such a method of preventing the blooming by the surface recombination, in which FIG. 1 shows a front view of an ordinary frame transfer type CCD.

In the drawings, a reference numeral 1 denotes a photosensing part consisting of a plurality of vertical transfer registers having photosensitivity.

On the other hand, a numeral 2 indicates a storage part consisting of a plurality of vertical transfer registers which are shielded against the light. represents a horizontal transfer register which simultaneously shifts the information in the respective vertical transfer registers of the storage part 2 by one bit, thereby taking them in this horizontal transfer register, then by allowing the register 3 to perform the horizontal transfer operation, a video signal can be obtained from an output amplifier 4.

Generally, the information formed in each vertical transfer register of the photosensing part 1 is vertically transferred to the storage part 2 in the vertical blanking interval in the standart television system and is sequentially read out on a line by line basis by the horizontal transfer register 3 in the next vertical scanning interval.

The photosensing part 1, storage part 2 and horizontal transfer register 3 are respectively two-phase driven and their respective transfer electrodes are indicated by $P_1$, $P_2$, $P_3$, $P_4$, $P_5$, and $P_6$ and the transfer clocks are represented by $\phi_{P1}$, $\phi_{P2}$, $\phi_{P3}$, $\phi_{P4}$, $\phi_{P5}$ and $\phi_{P6}$ respectively.

FIG. 2 is a diagram showing a potential profile under such transfer electrodes $P_1$–$P_6$. Low-potential portions and high-potential portions are formed under the respective electrodes provided on, for example, a p-type silicon substrate 6 through an insulating layer 5 by way of ion implantation or the like. For example, when a low-level voltage $-V_1$ is applied to the electrodes $P_2$, $P_4$ and $P_6$ and a high-level voltage $V_2$ is applied to the electrodes $P_1$, $P_3$ and $P_5$, the potentials such as indicated by the solid lines in FIG. 2 are formed. On the other hand, when the low-level voltage $-V_1$ is supplied to the electrodes $P_1$, $P_3$ and $P_5$ and the high-level voltage $V_2$ is supplied to the electrodes $P_2$, $P_4$ and $P_6$, the potentials such as indicated by the broken lines in FIG. 2 are formed.

Therefore, by applying the alternating voltages having opposite phases to each other to the electrodes $P_1$, $P_3$, $P_5$ and to the electrodes $P_2$, $P_4$, $P_6$ the carriers are sequentially transferred in one direction (to the right in the drawing).

In addition, the alternate long and short dash lines in FIG. 2 show the potentials when a large positive voltage $V_3$ is applied to the electrodes. Since the wells of these potentials are in the inverting state, the overflow carrier of not smaller than a predetermined amount will have been recombined with majority carrier and have been extinguished.

FIG. 3 is a diagram showing such a relation between the electrode voltage and the shape of the interval potential with respect to the direction of thickness of the semiconductor substrate 6. It can be seen from FIG. 3 that the potential well for the electrode voltage $V_3$ is shallow, so that the overflow carrier is in a second state in that it is recombined with the majority carrier at the interface with the insulating layer.

On the other hand, the potential state becomes the accumulation state as a first state at the electrode voltage $-V_1$, so that the majority carrier is easily collected around the interface; for example, this majority carrier is supplied from a channel stopper region (not shown).

Therefore, by alternately applying the voltages $-V_1$ and $V_3$ to the electrode $P_1$ in the state in that a varrier is formed by, for example, applying the voltage $-V_1$ to the electrode $P_2$, the minority carrier to be accumulated under the electrode $P_1$ is limited to not larger than a predetermined amount.

However on the contrary, to effectively extinguish the overflow carrier, the accumulation state and the inverting state have to be alternately formed at a high speed in the semiconductor substrate in the accumulating interval; therefore, this causes a problem such that an electric power consumption is large. In addition, if such a pulse control is performed at high speed, there will be also caused a problem such that the noise to be caused by this pulse is mixed to the signal. Also, there is a problem such that the dark current drift may easily occur due to such a pulse.

SUMMARY OF THE INVENTION

It is an object of the present invention to provide an image pickup apparatus which can solve such drawbacks in conventional technology.

Another object of the invention is to provide an image pickup apparatus which can effectively prevent the blooming and which has a high electric power saving effect.

Still another object of the present invention is to provide an image pickup apparatus which can eliminate the noise upon recording.

In addition, it is a further object of the present invention to provide an image pickup apparatus having a higher electric power saving effect in a system which can shield a photosensing part against the light by a shutter.

Another object of the invention is to provide an image pickup apparatus having a high electric power saving effect and a high noise preventing effect in a system which forms an image signal of one picture by a trigger signal.

A further another object of the present invention is to provide an image pickup apparatus which enables the optimum prevention of the blooming in response to the state of an object to be photographed.

The above and other objects, features and advantages of the present invention will be apparent from the following detailed description in conjunction with the accompanying drawings.

BRIEF DESCRIPTION OF THE DRAWINGS

FIG. 4 is a diagram showing a constitution of a first embodiment of an image pickup apparatus of the present invention;

FIG. 5 shows drive timing charts of the constitution shown in FIG. 4;

FIG. 7 shows drive timing charts of the constitution shown in FIG. 6;

DETAILED DESCRIPTION OF THE PREFERRED EMBODIMENTS

Figure 1:
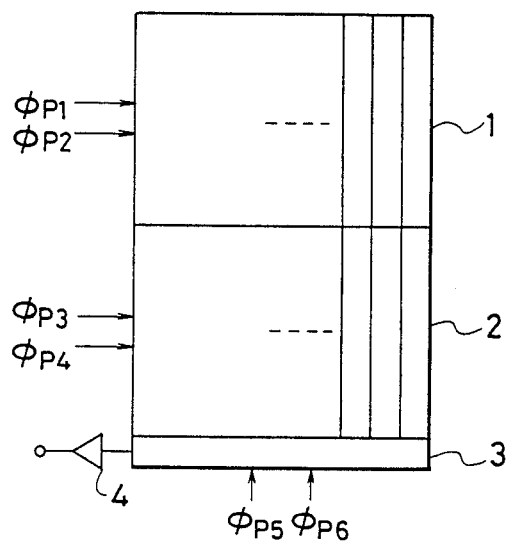
FIG. 1 is a diagram showing an example of an image sensor.
Figure 2:
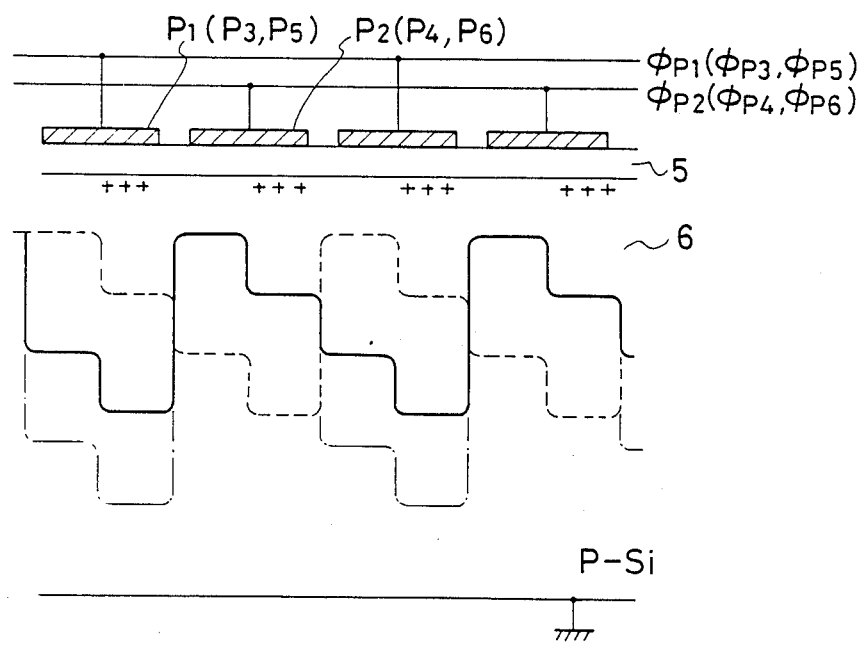
FIG. 2 is a diagram showing an example of a potential profile under each electrode.

The present invention will be described in detail hereinbelow with respect to embodiments.

FIG. 4 is a diagram showing a first embodiment of a constitution of an image pickup apparatus of the present invention and FIG. 5 shows timing charts thereof, in which a reference numeral 100 denotes an image sensor as image pickup means. This image sensor may be a CCD such as shown in FIG. 1 or may be an XY address image sensor of the MOS type.

In this embodiment, the case will be described where the frame transfer type CCD shown in FIG. 1 is used.

A reference numeral 7 represents a driver circuit as readout means for supplying transfer pulses $\phi_{P1}-\phi_{P6}$ which are necessary for the transfer of this CCD image sensor and an anti-blooming pulse $\phi_{AB}$ which will be described later. Numeral 9 is a first clock generator as a clock signal source for forming timing signals of $\phi_{P1}-\phi_{P6}$ among these pulses. Numeral 8 is a second clock generator as recombination means and the driver circuit 7 forms the anti-blooming pulse $\phi_{AB}$ in response to the timing signal from this clock generator 8 and supplies to the electrode $P_1$ or $P_2$ of the image sensor.

After the output of the image sensor 100 was amplified by an amplifier 10, it is subjected to the γ-compensation, aperture-compensation, etc. in a processor 11 and is introduced through a gate 12 to a head 13 and is recorded in a recording medium 14. The head 13, medium 14, etc. constitute recording means. The output of the gate 12 may be supplied not only to the recording means but also to, for example, a transmitting apparatus, printer, or the like.

A reference numeral 19 is a trigger circuit as trigger means for forming a pulse signal by operating an operating switch TB. This trigger circuit is provided to selectively perform the recording, transmission, printing, or the like of the image of one field or one frame as will be described later by operating this operating switch TB at a proper timing while, for example, observing the output of the processor 11 by a video monitor. As shown in FIG. 5, a high-level signal is output from a one-shot circuit 18 for only a predetermined interval (e.g., one vertical sync interval) synchronously with the trailing edge of the pulse output from the trigger circuit 19.

Numeral 16 is a one-shot circuit for outputting a high-level pulse for a predetermined interval synchronously with the trailing edge of a vertical sync pulse $V_D$ from the clock generator 9. The output of this one-shot circuit 16 is input to a clock input terminal of a D-flip-flop.

Therefore, as shown in FIG. 5, the gate 12 is open for an interval of time from a time point $t_1$ when the first vertical sync signal $V_D$ was obtained after the trigger pulse from the trigger circuit 19 had been outputted to a time point $t_2$ when the next vertical sync signal is obtained. Thus, the signal of one field is recorded in the recording medium 14 through the head 13. The recording medium 14 is driven by a motor MT which rotates synchronously with the phase of the vertical sync signal.

On the other hand, while this gate 12 is open, the output of the second clock generator 8 is stopped through an inverter 20. A control block 15 consisting of the one-shot circuits 16 and 18, a flip-flop 17, etc.

Furthermore, as shown in FIG. 5, the anti-blooming pulse $\phi_{AB}$ is made inoperative during the vertical transfer intervals $t_1-t_2$, $t_3-t_4$, $t_5-t_6$ and $t_7-t_8$.

Also, the pulse $\phi_{AB}$ is switching controlled by the driver 7 so as to be alternately added to the pulse $\phi_{P1}$ or pulse $\phi_{P2}$ for every field. In addition, the phases of the pulses $\phi_{P1}$ and $\phi_{P2}$ are shifted by only one field; therefore, the locations of the potential well and potential barrier are shifted by only the amounts corresponding to the electrodes $P_1$ and $P_2$ for every field. Due to this, the interlacing is performed. The pulse $\phi_{AB}$ is added to the electrode which does not form the potential barrier, i.e., to the electrode whose potential is 0 level in case of FIG. 5.

In addition, in this embodiment, although the formation of the pulse $\phi_{AB}$ is stopped for only the interval when the output of the image sensor is being recorded, it may be possible to the pulse $\phi_{AB}$ for only a proper period of time, e.g., a few V (vertical intervals) after the recording was started.

In this way, since there is an operating time lag until the next recording operation is done after the recording operation was finished, a larger electric power saving effect will be obtained if a system is constituted so as to stop the pulse $\phi_{AB}$ for only a predetermined time after the recording was started as described above.

In addition, although the case has been described where only one field in the video signal to be formed continuously is extracted and is recorded in this embodiment, the present invention is of course effective to a constitution in which the image sensor is exposed a predetermined time by a shutter or the like and thereafter the picture image on this image sensor is read out and is recorded for example as the image information of two fields which were mutually interlaced.

Moreover, in this embodiment, $\phi_{AB}$ is set into 0 level and is made inoperative for only a predetermined time after the recording was started by opening the gate 16; however, it may be possible to apply the potential of for example $-V_1$ in this interval except the vertical transfer interval. In this case, an effect such that the dark current is difficult to be generated is produced.

As described above, in this embodiment, the supply of the high-frequency pulse for the anti-blooming is stopped in association with the starting of the recording of the signal output to be read out from the image pickup means; therefore, it is possible to save an electric power consumption. Moreover, the blooming is difficult to be caused in the video signal to be recorded.

On the other hand, since the noise to be caused due to the pulse for the above-mentioned anti-blooming is not generated during the recording, an S/N ratio of the recording signal does not deteriorate.

Figure 6:
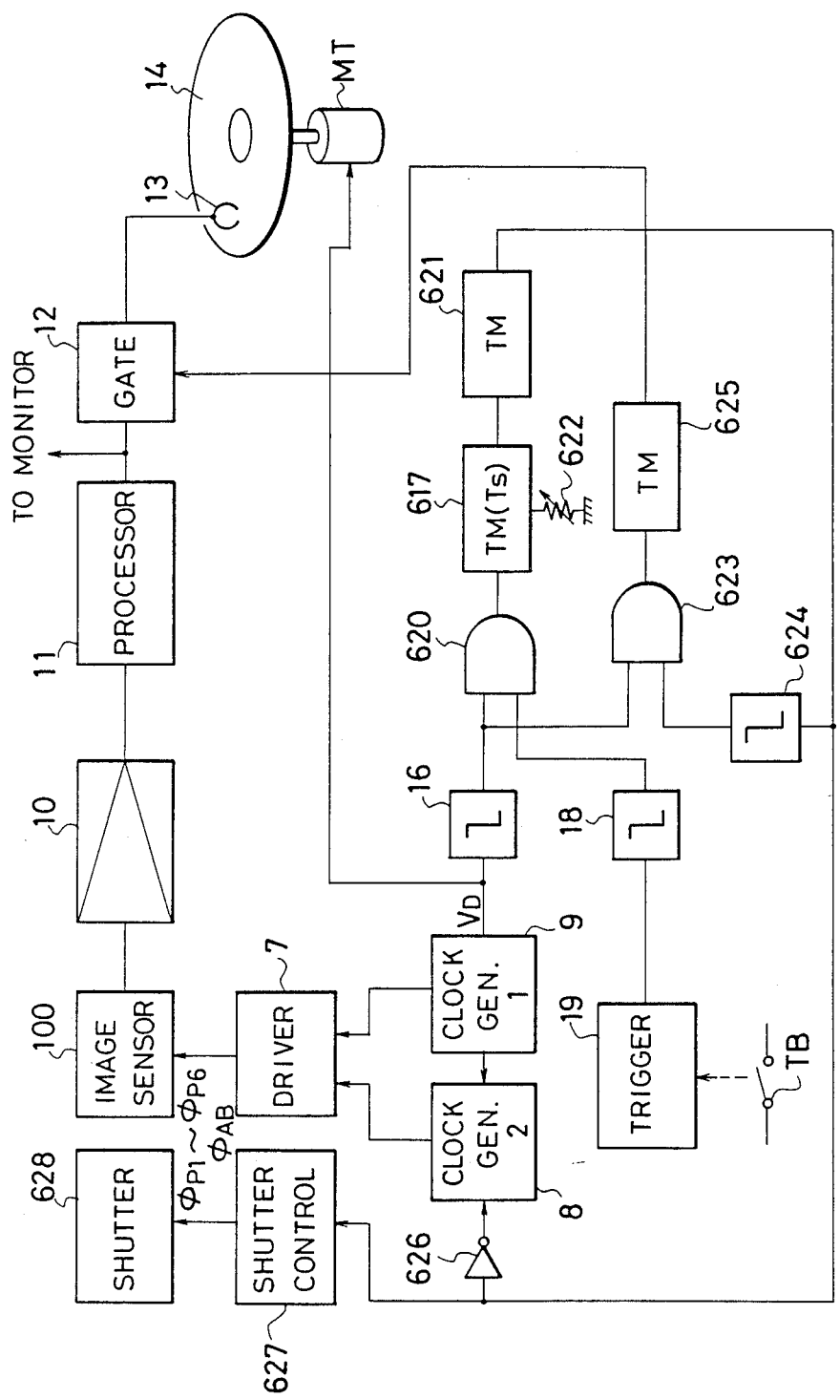
FIG. 6 is a diagram showing a constitution of a second embodiment of the image pickup apparatus of the present invention.

Next, FIG. 6 is a diagram showing a second embodiment of the image pickup apparatus of the present invention and FIG. 7 shows timing charts thereof. In FIGS. 6 and 7, the same elements as those in FIGS. 1-5 are designated by the same reference numerals. This embodiment shows the case where a shutter 628 is provided in front of the image sensor 100.

In this embodiment, the output of the one-shot circuit 16 and the output of the one-shot circuit 18 are input to an AND gate 620.

Therefore, as shown in FIG. 7, a high-level signal is output from the AND gate 620 synchronously with the trailing edge of the first vertical sync signal $V_D$ after the trigger pulse was outputted. A reference numeral 617 denotes a timer for specifying the exposure time by the shutter 628. When the high-level signal is inputted from the AND gate 620, the timer 617 outputs a high-level pulse at a time point when a time Ts which was set by a setting resistor 622 passed after the trailing edge of that high-level signal.

Numeral 621 is a timer for outputting a high-level signal for only a predetermined time in response to this pulse. The shutter 628 is closed for this high-level signal interval in response to the output from a shutter control circuit 627.

The shutter 628 is energized ordinarily by a spring and the like so as to be opened.

In addition, the second clock generator 8 is controlled so as to be stopped by an inverter 626 during the interval when this shutter is closed.

This inverter 626 and the timer 621 constitute stop means according to the present invention.

The output of a one-shot circuit 624 for forming a pulse synchronously with the leading edge of the timer 621 and the output of the one-shot circuit 16 are supplied to a timer circuit 625 through an AND gate 623.

The timer circuit 625 is the circuit for outputting high-level signal synchronously with the leading edge of the input signal for only, e.g., 1 V (vertical interval) and opens the gate 12 during only this high-level interval.

Thus, the recording is started synchronously with the first vertical sync signal after the shutter was closed and the signal for one field interval is recorded.

On the other hand, the formation of the pulse $\phi_{AB}$ is stopped for only the interval when the light incidence to the image sensor 100 is blocked by the shutter 628 in this embodiment; however, it may be possible to stop the pulse $\phi_{AB}$ for only a proper time, e.g., a few V (fertical interval) after the closing of the shutter was started.

Figure 8:
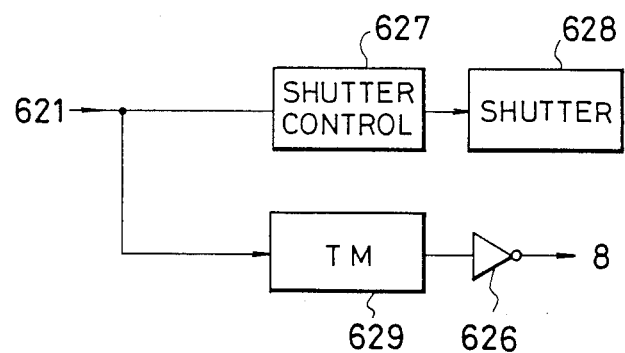
FIG. 8 is a diagram showing an example of the constitution in which a part of the embodiment shown in FIG. 6 is changed.

FIG. 8 is a diagram showing such an embodiment. In this embodiment, the output of the timer circuit 621 is inputted to the shutter control circuit 627 and is used for the opening and closing controls of the shutter 628, and at the same time it is inputted to a timer circuit 629. This timer circuit 629 outputs a high-level signal for a predetermined time (e.g., a few V intervals) after the leading edge of the output of the timer circuit 621.

The output of this timer circuit 629 is inputted to the clock generator 8 through the inverter 626.

Therefore, once the output of the timer circuit 621 rises, it is possible to disable $\phi_{AB}$ irrespective of the opening/closing of the shutter 628.

Since there is a time lag with regard to the operation until the next image pickup operation is further performed after the recording operation was carried out upon completion of the image pickup operation using the shutter, if a system is constituted in the manner such that the pulse $\phi_{AB}$ is stopped for only a predetermined time after the closing of the shutter was started as described above, a larger electric power saving effect will be obtained and will be actually useful.

As described above, according to the second embodiment, the shutter for blocking the light incidence to the image pickup means is provided, thereby making the exposure time control possible by this shutter and enabling the smear during the vertical transfer interval to be prevented, and at the same time while at least the light incidence is blocked by this shutter, the pulse $\phi_{AB}$ for the anti-blooming is not formed; therefore, the electric power to be consumed can be remarkably saved.

In addition, since almost only the dark current exists while the shutter is closed, no blooming occurs; on the other hand, while the shutter is open, the overflow carrier is extinguished by the pulse $\phi_{AB}$, so that the blooming is effectively suppressed.

The dark current drift and noise are certainly reduced while the pulse $\phi_{AB}$ is stopped, so that the recording signal and the like are not adversely affected.

Figure 9:
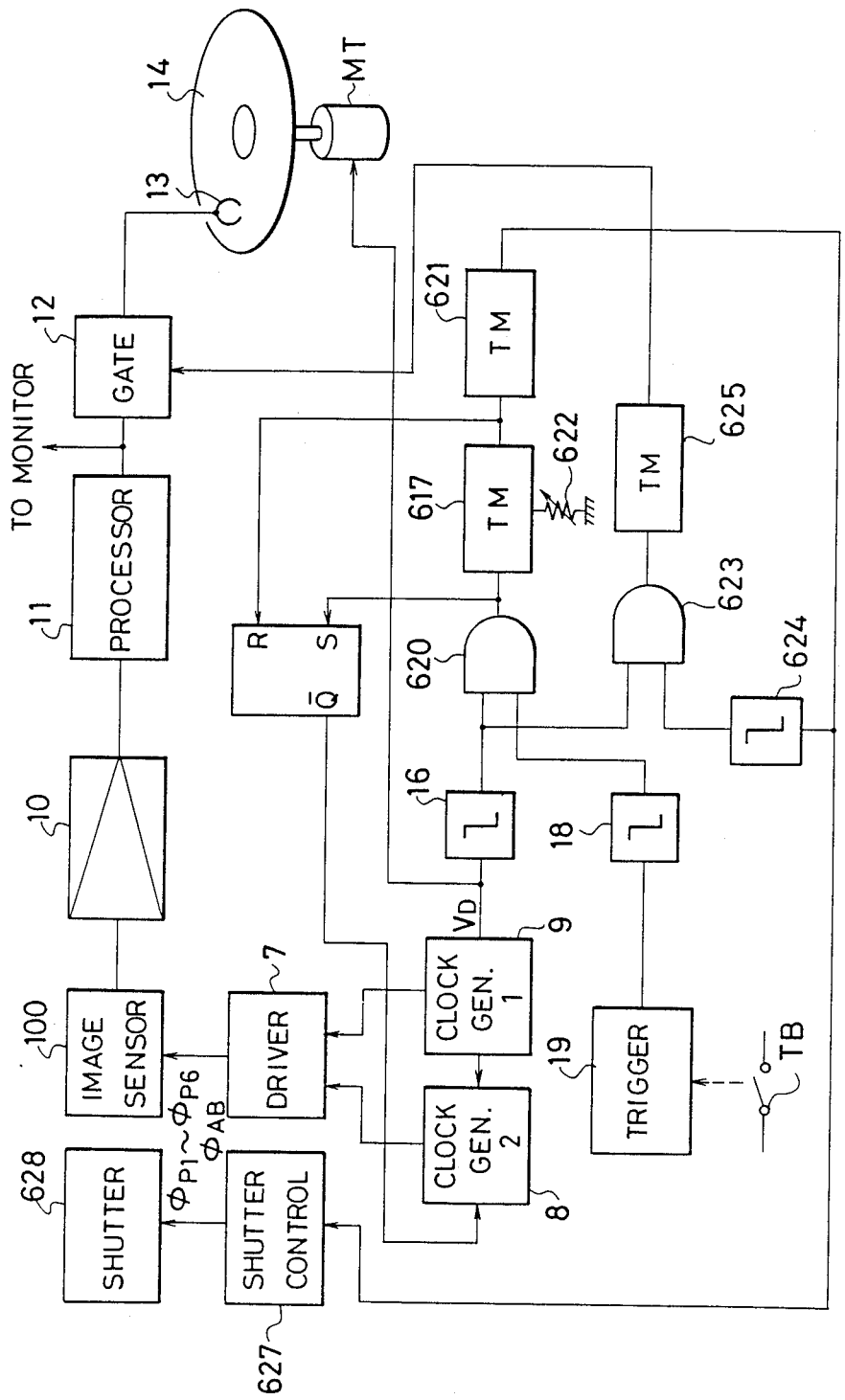
FIG. 9, is a diagram showing a third embodiment of the image pickup apparatus of the present invention.
Figure 10:
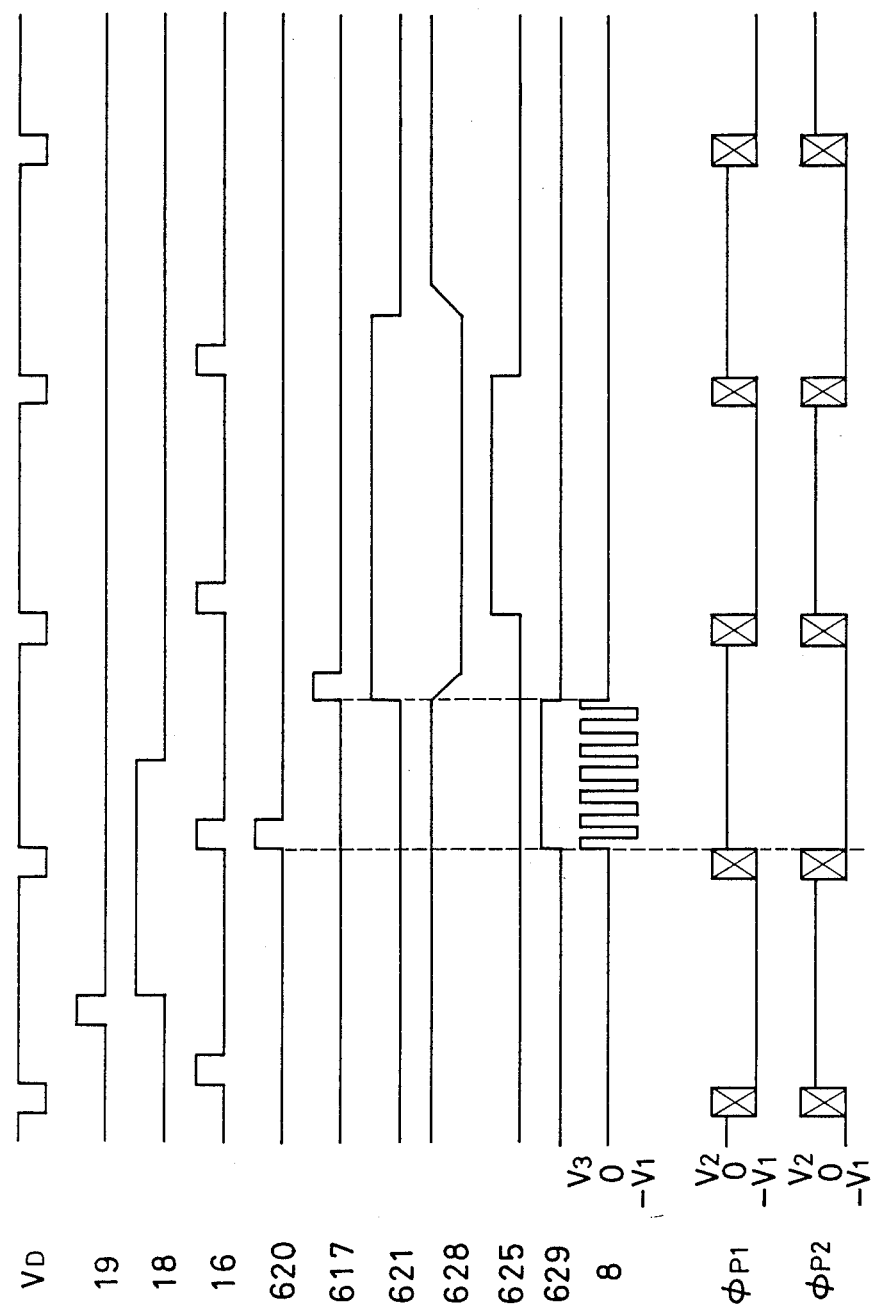
FIG. 10 shows timing charts thereof.

Now, FIG. 9 is a diagram showing a third embodiment of the present invention and FIG. 10 shows timing charts thereof, in which the same elements as those shown in FIGS. 1–8 are designated by the same reference numerals. In FIG. 9, a reference numeral 926 denotes an RS flip-flop which is set in response to the leading edge of the output of the AND gate 620 and is reset responsive to the leading edge of the output of the timer 617. The $\overline{Q}$ output of this RS flip-flop controls the on-off operations of the second clock generator 8. Namely, when the $\overline{Q}$ output is high, the generator 8 is turned off and when the $\overline{Q}$ output is low, it is turned on.

According to this embodiment, the recombination control means for preventing the blooming is made operative only for the interval when the picture image information to be selected by the selecting means is being accumulated by the image sensor, so that the electric power to be consumed can be extremely reduced.

In addition, since the dark current drift and noise are decreased while the pulse $\phi_{AB}$ is stopped, the recording signal and the like are not adversely influenced.

On one hand, in the second and third embodiments, since the shutter 628 is closed even while the signal selected by the gate 12 is being recorded or the like, there is not a fear of mixture of the blooming noise on the next screen into the above-mentioned signal selected.

Although the exposure time control and the prevention of the smear during the vertical transfer interval are performed by the shutter in this embodiment, the present invention can be of course applied to a system using no shutter.

Figure 11:
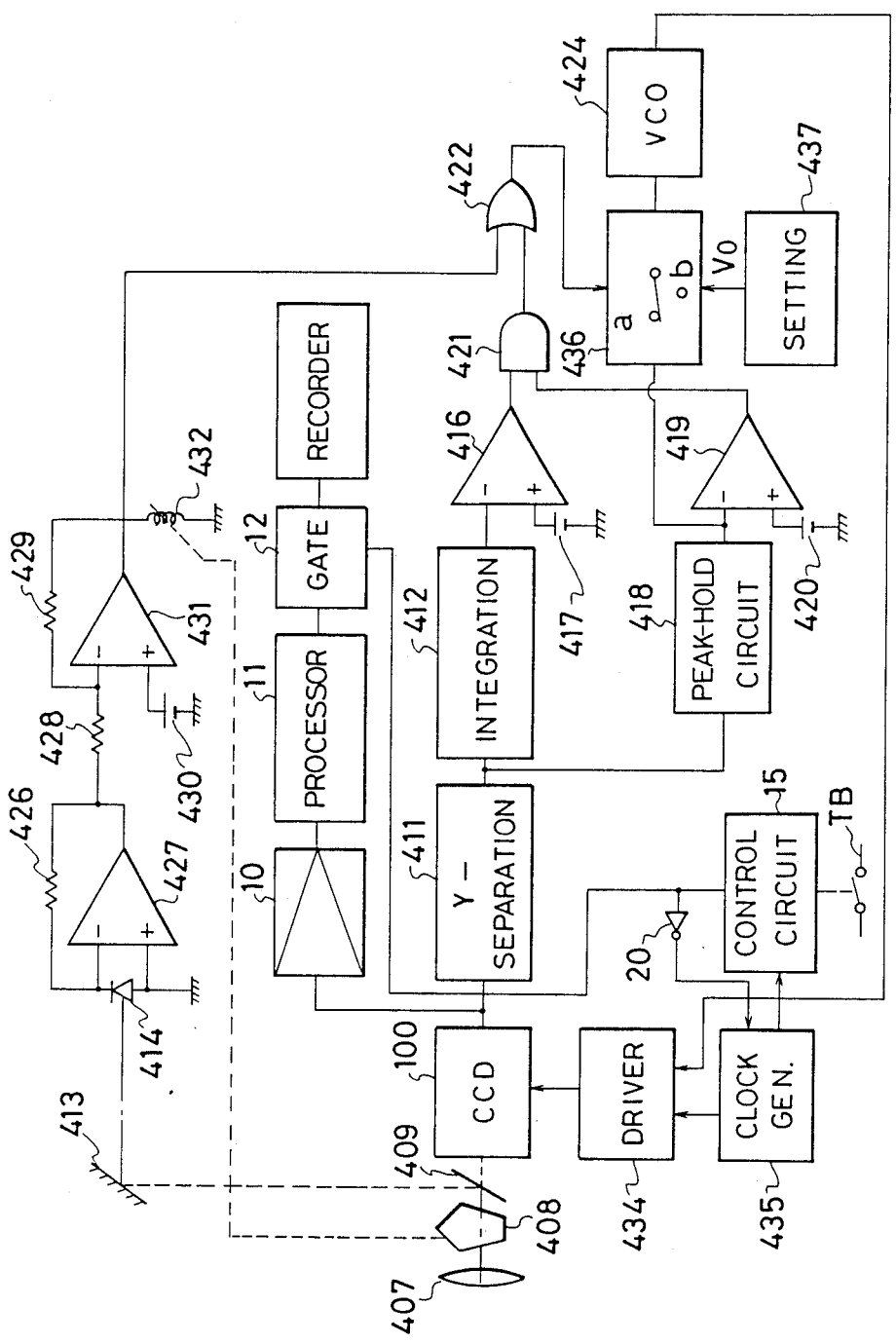
FIG. 11 is a diagram showing a fourth embodiment invention.

Next, FIG. 11 is a block diagram showing a fourth embodiment of the image pickup apparatus of the present invention. In the drawing, a light incidence from an object to be photographed passes through an optical system indicated by 407 and a diaphragm 408 disposed on the optical path thereof. This incident light is formed on the image sensor 100 such as, for example, a CCD or the like as shown in FIG. 1 and at the same time it enters a photometric photosensing device 414 through a beam splitter 409 and a deflecting mirror 413.

The photosensing device 414, an operational amplifier 427 and a resistor 426 constitute a well-known photoelectric converter. In addition, a resistor 428, a resistor 429, an operational amplifier 431, and a reference voltage source 430 which are connected to the output of the operational amplifier 427 constitute an inverting amplifier for comparing the output from the operational amplifier 427 with the reference voltage source 430 and invertedly amplifying it. The output thereof is connected to one input terminal of an OR gate 422 and at the same time it is connected to a driving coil 432 for driving the diaphragm. The diaphragm driving coil 432 serves to open the diaphragm 408 when a positive voltage is applied by the operational amplifier 431 and to close the diaphragm 408 when a negative voltage is applied. The output of the image sensor 100 is connected to a luminance separating circuit 411 and the output of the circuit 411 is further connected to an integrating circuit 412 and a peak-hold circuit 418, respectively. The output of the integrating circuit 412 is connected to an inverting input of a comparator 416 and a non-inverting input of the comparator 416 is connected to a reference voltage source 417. The output of the comparator 416 is connected to one input of an AND gate 421. The integrating circuit may be a smoothing circuit, mean value circuit or low-pass filter. The output of the peak-hold circuit 418 is connected to an inverting input of a comparator 419 and a non-inverting input of the comparator 419 is connected to a reference voltage source 420. The output of the comparator 419 is connected to the other input of the AND gate 421. The output of the AND gate 421 is connected to the other input of the OR gate 422. The output of the OR gate 422 is connected to a control terminal of a switching circuit 436. The output of the peak-hold circuit 418 is connected to a voltage controlled oscillator 424 through the switching circuit 436. The output of the voltage controlled oscillator 424 is connected to a driver 434 for forming a driving pulse of the CCD 100. A reference numeral 435 is a clock generator for outputting timing signals of various pulses to drive the CCD 100.

The driver 434 outputs the pulses $\phi_{P1}-\phi_{P6}$ in response to these timing signals.

Figure 3:
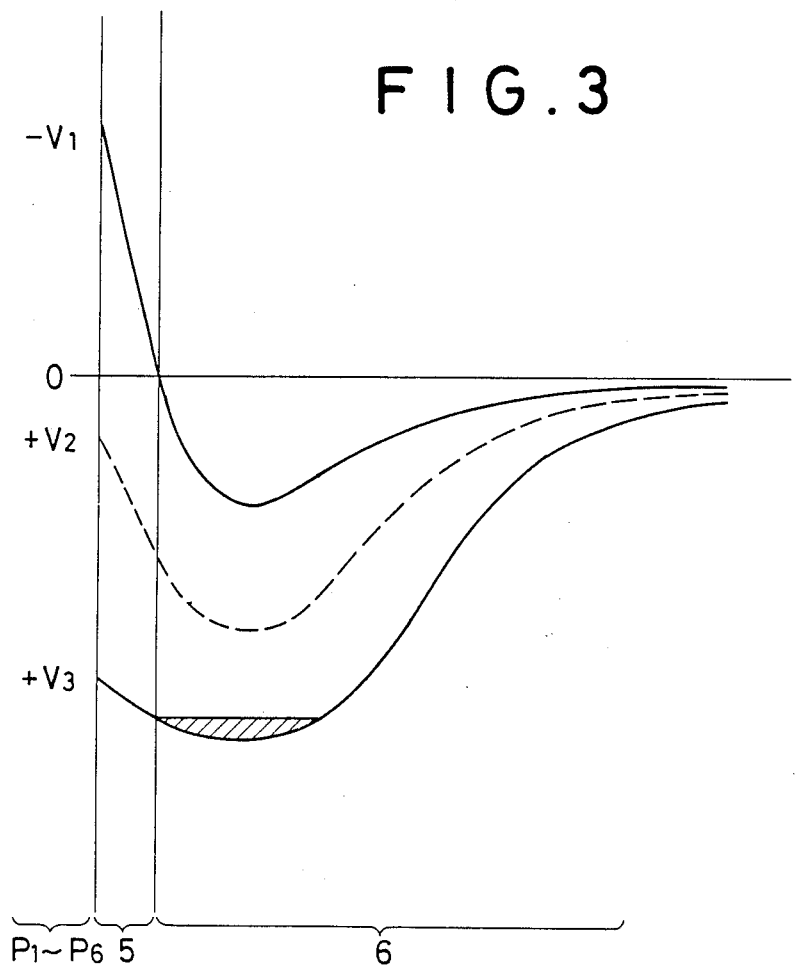
FIG. 3 is a diagram showing potential characteristics in accordance with the electrode potentials.

On the other hand, the driver 434 forms the alternating pulse $\phi_{AB}$ which changes between the voltages $-V_1$ and $+V_3$ in FIG. 3 in response to the output of the voltage controlled oscillator 424 and supplies this pulse $\phi_{AB}$ to the CCD.

Numeral 437 indicates a setting value circuit connected to the b side of the switching circuit 436. While a high-level signal is output from the OR gate 422, the contact of this switching circuit 436 is switched to the b side in response to this high-level signal, so that a predetermined set value V is input to an input terminal of the voltage controlled oscillator 424. The set value is for example 0 (volt) and the oscillator, 424 is constituted in the manner such that the oscillating frequency is zero, namely, the oscillation is stopped for the 0-volt input.

In addition, the circuits 412, 416, 418-420, 422, 414, 426-431, etc. constitute object information detecting means for forming information with respect to the brightness or the like of the object. Also, the circuits 424, 436, 437, etc. constitute second control means for controlling the recombination state in response to the signal from this forming means.

The operation of the constitution shown in FIG. 11 will now be described. In the case where the amount of light incidence into the photosensing device 14 is smaller than a appropriate value, the output of the photoelectric converter becomes low voltage, so that the output of the inverting amplifier 431 becomes positive high voltage. Therefore, the positive voltage is applied to the diaphragm driving coil 432, so that the diaphragm is driven so as to be open. On the contrary, in the case where an amount of light incidence into the photosensing device 414 is larger than the appropriate value, the opposite operation to the above is performed, so that a current flows through the diaphragm driving coil 432 in the direction such as to close the diaphragm, thereby reducing the light incident amount.

On the other hand, the object image formed on the image sensor 100 is photoelectric converted and the charge information is formed in the image sensor 100. The luminous component is separated from the output of the image sensor 100 by the luminance separating circuit 411 and is integrated by the integrating circuit 412, thereby detecting the mean luminous level of the object.

The comparator 416 compares this level with a predetermined reference level and when the output of the integrating circuit 412 is lower than the predetermined level, a high-level signal is outputted from the comparator 416.

Namely, when the mean luminous level of the object is lower than that by a certain value, a high-level signal is obtained from the comparator.

On one hand, the output of the luminance separating circuit 412 is connected to the peak-hold circuit 418, thereby detecting the peak in the luminance signal. The comparator 419 compares the peak thus detected with the voltage of the reference voltage source 420 and when the peak level is lower than that, a high-level signal is outputted. Only in the case where both outputs of the comparators 416 and 419 are at high level, i.e., only when the mean luminance of the object is low and the highest luminance is also low, the AND gate 421 outputs a high-level signal and the OR gate 422 also outputs a high-level signal, so that the switch 436 is switched to the b side, thereby stopping the oscillation of the voltage controlled oscillating circuit 424.

In addition, since the outputs of the integrating circuit 412 and peak-hold circuit 418 are delayed by only the output scanning time of the image sensor 100 and at the same time the time lag to be caused due to the diaphragm (stop) adjusting operation is further added to those outputs, in the case where the light incidence into the photosensing device 414 is too weak as a result of that, for example, the diaphragm was adjusted to be too narrow, namely, in the case where a positive voltage is applied to the diaphragm driving coil 432 and it is driven so as to open the diaphragm, a high-level signal is inputted to the OR gate 422, so that the OR gate 422 outputs a high-level signal. Consequently, the oscillation of the oscillator 424 is stopped similarly as described before.

In the state where this oscillation was stopped, the image sensor 100 is ordinarily periodically driven by the pulses $\phi_{P1}$-$\phi_{P6}$ shown in FIG. 1 and $\phi_{AB}$ is not added.

Furthermore, when the output of the OR gate 422 is at low level, the output of the peak-hold circuit 418 is inputted to the voltage controlled oscillator 424 through the switch 436 and the oscillator 424 generates the pulse train of higher frequency in response to the peak value as the peak value is larger, so that the pulse $\phi_{AB}$ in accordance with that pulse train is supplied to the image sensor 100.

In addition, in this embodiment, when a power supply (not shown) is turned on, the pulses $\phi_{P1}$-$\phi_{P6}$ are always supplied at the cycle in accordance with an ordinary standard television system and at the same time its pulse voltage is set so as to change between $-V_1$ and $+V_2$ in FIG. 3.

Also, the pulse $\phi_{AB}$ is supplied to the transfer electrodes of the image sensor by being added to these pulses $\phi_{P1}$-$\phi_{P6}$.

Moreover, the pulse $\phi_{AB}$ is controlled by the driver 434 so as to be at 0 level while the charge information in the photosensing part 1 of the image sensor 100 is being vertically transferred to the storage part 2. Therefore, $\phi_{AB}$ does not disturb the vertical transfer.

As described above, according to the present invention, an object image is converted into charge information by the image pickup means, this charge information is read out to obtain a luminance signal, and the frequency of the recombination pulse of the charges is controlled in dependence upon the peak level of this luminance signal; therefore, it is possible to effectively utilize the electric power necessary for recombination.

In addition, in this embodiment, in the case where the average level of the luminance signal is smaller than a predetermined level and at the same time when the peak level of the luminance signal is smaller than a predetermined level, the formation of the pulse $\phi_{AB}$ for recombination is stopped; thus, this enables unnecessry electric power consumption to be effectively reduced.

Moreover, since the pulse $\phi_{AB}$ is also stopped in the case where the photometric output of another photometric device other than the image pickup means is smaller than a predetermined level, even in the case where, for example, a picture plane is suddenly switched from a bright object to a dark object, or the like, unnecessary pulse $\phi_{AB}$ can be omitted with high response speed.

Figure 12:
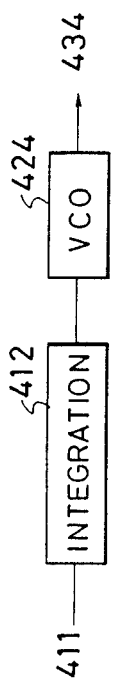
FIG. 12 is a diagram showing a fifth embodiment of the present invention.

On the other hand, in this embodiment, although the oscillating frequency of the voltage controlled oscillator (VCO) 424 is changed in accordance with the output of the peak-hold circuit 418, i.e., with the peak value of the luminance signal, it may be possible to control the oscillating frequency of the VCO 424 in dependence upon the output level of the integrating circuit 412 of FIG. 11 as a fifth embodiment as shown in FIG. 12. In this case, the frequency of the VCO 424 may be set to be high in dependence upon an increase in the output of the circuit 412.

Figure 13:
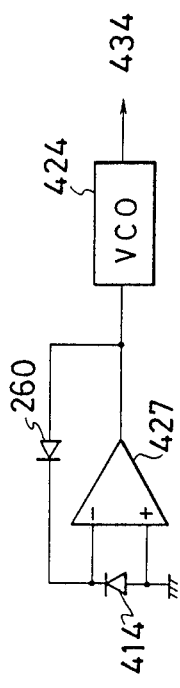
FIG. 13 is a diagram showing a sixth embodiment of the present invention.

Or as shown in FIG. 13 as a sixth embodiment, by connecting the photosensing device 414, operational amplifier 427 and a diode 260 for logarithm compression as shown in the drawing, the logarithm compression value responsive to the incident light amount into the photosensing device is outputted and the frequency of the pulse $\phi_{AB}$ may be controlled depending upon the logarithm of the incident light amount into the photosensing device 414 by inputting this output value to the VCO 424.

This frequency $\phi_{AB}$ is controlled so as to become high in response to an increase in the incident light amount in the similar manner as in the fourth and fifth embodiments.

In addition, the photosensing device 414 may be the device for measuring the TTL (Through The Lens) light or the device for measuring the outside light.

On the other hand, the oscillating frequency of the VCO 424 may be continuously controlled in the 4th-6th embodiments and the frequency may be changed step by step by being divided into several stages.

These 5th and 6th embodiments allow the constitution to be simplified.

Figure 14:
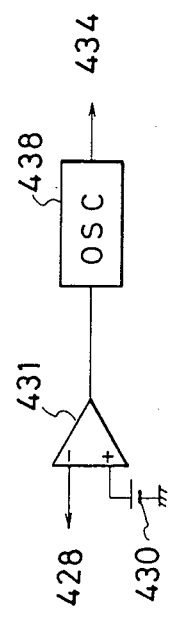
FIG. 14 is a diagram showing a seventh embodiment of the present invention.

FIG. 14 is a diagram showing a seventh embodiment of the present invention, in which an oscillator 438 for forming the pulse $\phi_{AB}$ for recombination of constant frequency by the driver 434 is provided in place of the oscillator 424 shown in FIG. 11, thereby stopping this oscillator 438 while the output of the comparator 431 shown in FIG. 11 is at high level.

Although not shown, even in this case, the output of the photosensing device 414 shown in FIG. 11 is inputted through the resistor 428 to the comparator 431 and this photosensing device 414 may be the device for measuring the outside light.

Figure 15:
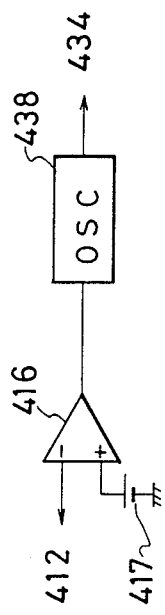
FIG. 15 is a diagram showing an eighth embodiment of the present in addition.

FIG. 15 is a diagram showing an eighth embodiment of the present invention, in which the on-off operations of the oscillator 438 in the 7th embodiment are performed by the comparator 416 shown in FIG. 11, and the oscillator 438 is turned off while the comparator 416 outputs a high-level signal.

Figure 16:
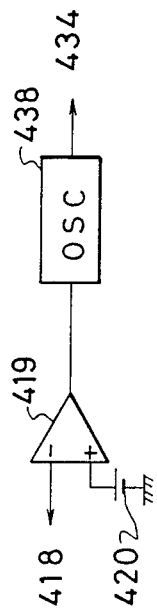
FIG. 16 is a diagram showing a ninth embodiment of the present invention.

FIG. 16 is a diagram showing a ninth embodiment, in which the oscillator 438 of FIG. 15 is turned off while the output of the comparator 419 shown in FIG. 11 is at high level.

As described above, in the embodiments shown in FIGS. 14-16, the oscillation of the pulse $\phi_{AB}$ is turned off in any one case of the cases where the output of the photosensing device is lower than a predetermined level, where the mean value of the luminance signal is lower than a predetermined level, and where the peak value of the luminance signal is lower than a predetermined level; therefore, a high electric power saving effect is obtained and a circuit constitution is also simplified.

As described above, according to these embodiments, the oscillating frequency of the pulse for recombination is controlled in a predetermined range including zero in accordance with the state of the luminance of an object (for example, output level of the photosensing device, average level of the luminance signal, peak value of the luminance signal, etc.), so that the electric power in association with the formation of the pulse for recombination can be effectively saved and at the same time there is an effect such that the blooming is difficult to be caused. That is to say, since the frequency of the pulse $\phi_{AB}$ becomes higher as the peak of the luminance level or of a part thereof becomes higher, the recombination speed of the overflow charges becomes faster in accordance with that frequency, thereby enabling the overflow charges to be efficiently extinguished.

What we claim is:

1. An apparatus comprising:
   converting means for converting incident radiation into charge information;
   reading out means for periodically reading out said charge information by one picture from said converting means;
   record means for recording said charge information on a medium as a still image; and
   prevent means for preventing an overflow of said charge information of said converting means, said prevent means having a first mode for intermittently preventing the overflow of said charge information while said reading out means periodically reads out said charge information by one picture, and a second mode for stopping said preventing operation at least while said record means records said charge information as the still image.

2. An apparatus of claim 1 further comprising:
   power supply means, for supplying power to said prevent means to prevent said overflow.

3. An apparatus of claim 1, wherein said incident radiation comprises an image.

4. An apparatus according to claim 1, further comprising a shutter which is maintained open in said first mode and closed for a predetermined time in said second mode.

5. An apparatus according to claim 4, wherein while said shutter is closed in said second mode said record means records said charge information as the still image.

6. An apparatus according to claim 5, wherein while said shutter is closed said prevent means stops said preventing operation.

7. An apparatus according to claim 1, wherein said prevent means comprises combining means for combining a part of charge information converted by said converting means with a charge opposite in polarity to said charge information.

8. An image pickup apparatus comprising:
   converting means for converting incident radiation into charge information;
   reading out control means for periodically reading out said charge information by one picture from said converting means;
   record means for recording said charge information as a still image;
   shutter means for shielding said conversion means from light at least while said still image is recorded by said record means;
   prevent means for preventing an overflow of said charge information of said converting means, said prevent means having a first more for intermittently preventing the overflow of said charge information while said reading out means periodically reads out said charge information by one picture, and a second mode for stopping said preventing operation at least while said shutter means shields said converting means from light.

9. An image pickup apparatus according to claim 8, wherein said prevent means comprises combining means for combining a part of charge information converted by said converting means with a charge opposite in polarity to said charge information.

10. An image pickup apparatus according to claim 8, wherein said shutter means is maintained open in said first mode and closed for a predetermined time in said second mode.

* * * * *

UNITED STATES PATENT AND TRADEMARK OFFICE
CERTIFICATE OF CORRECTION

PATENT NO. : 4,868,680

DATED : September 19, 1989

INVENTOR(S) : Suga et al.

It is certified that error appears in the above-identified patent and that said Letters Patent is hereby corrected as shown below: ON TITLE PAGE:

[56] REFERENCES CITED:
    Column 2, Line 1, change "Tsunakawa et al." to --Tsunekawa et al.--.

[57] ABSTRACT
    Line 3, change "of" to --of a--; and
    Line 4, change "that" to --that a--.

COLUMN 1,
    Line 37, change "represents" to --3 represents--;
    Line 41, change "register, than by allowing the" to --register. The--;
    Line 42, change "to perform" to --then performs--; and
    Line 47, change "standart" to --standard--.

COLUMN 2,
    Line 13, change "majority carrier and have" to --the majority carrier and will be--;
    Line 14, delete "been";
    Line 29, change "varrier" to --carrier--;
    Line 39, delete "an";
    Line 42, change "to" to --with--; and
    Line 67, delete "another".

COLUMN 3,
    Line 32, change "invention" to --of the present invention;--;
    Line 40, change "in addition;" to --invention;--; and
    Line 68, change "supplies" to --supplies it--.

COLUMN 4,

Line 60, change "to the" to --to form the--.

UNITED STATES PATENT AND TRADEMARK OFFICE
CERTIFICATE OF CORRECTION

PATENT NO. : 4,868,680

DATED : September 19, 1989

INVENTOR(S) : Suga et al.

It is certified that error appears in the above-identified patent and that said Letters Patent is hereby corrected as shown below:

COLUMN 5,
Line 5, change "exposed" to --exposed for--;
Line 12, change "gate 16;" to --gate 12--; and
Line 65, change "high-level signal" to --a high level signal--.

COLUMN 6,
Line 9, change "(fertical interval)" to --(vertical interval)--.

COLUMN 7,
Line 37, change "tc" to --to--.

COLUMN 8,
Line 11, change "set value V" to --set value Vo--;
Line 25, change "incidence" to --incident--; and change "photosensing device 14" to --photosensing device 414--;
Line 26, change "a" to --an--; and

COLUMN 12,
Line 24, change "more" to --mode--.

Signed and Sealed this

Thirty-first Day of December, 1991

Attest:

HARRY F. MANBECK, JR.

Attesting Officer

Commissioner of Patents and Trademarks